(No Model.)
2 Sheets—Sheet 1.
O. HEINRICH.
SELF FASTENING BOX.
No. 530,225. Patented Dec. 4, 1894.
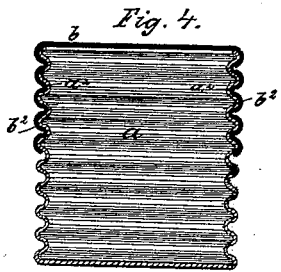
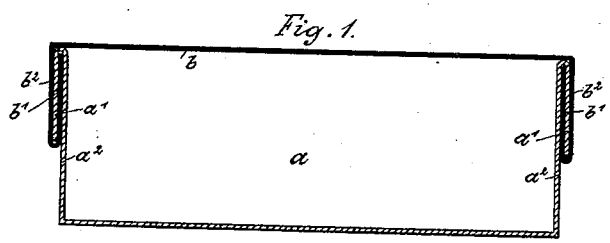
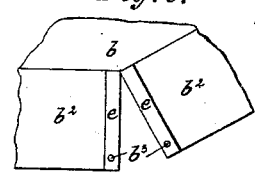
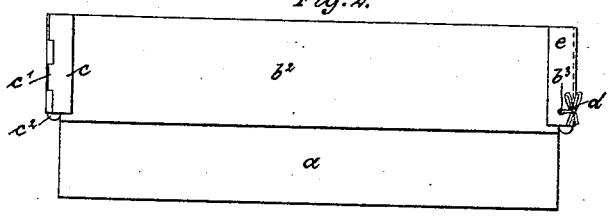
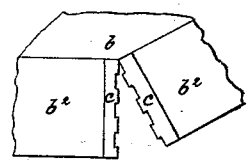
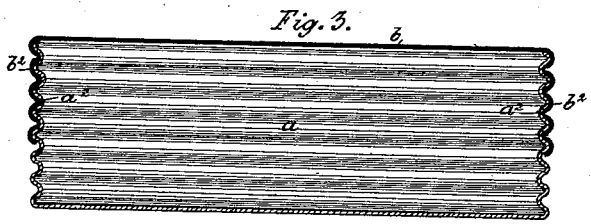
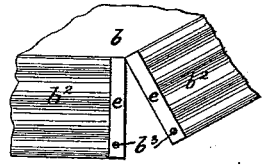
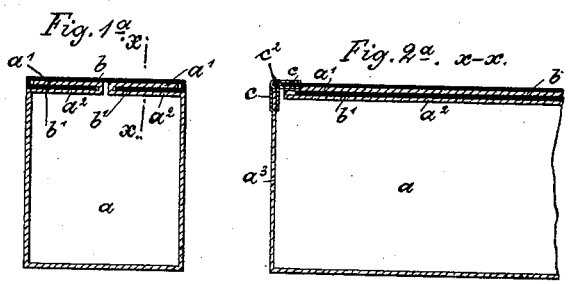
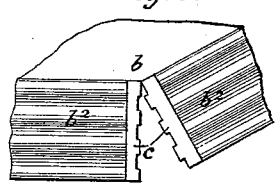
WITNESSES:
E. B. Bolton
E. K. Sturtevant
INVENTOR
Oswald Heinrich
BY
Rewards & R
ATTORNEY.
THE NORRIS PETERS CO., PHOTO-LITHO., WASHINGTON, D. C.

(No Model.) 2 Sheets—Sheet 2.

O. HEINRICH.
SELF FASTENING BOX.

No. 530,225. Patented Dec. 4, 1894.

WITNESSES:
E. R. Bolton
E. K. Sturtevant

INVENTOR
Oswald Heinrich
BY
ATTORNEYS.

THE NORRIS PETERS CO., PHOTO-LITHO., WASHINGTON, D. C.

UNITED STATES PATENT OFFICE.

OSWALD HEINRICH, OF MITTELWALDE, ASSIGNOR OF ONE-HALF TO MICHAEL GOLDSCHMIDT, PHILIPP GOLDSCHMIDT, AND SIEGFRIED GOLDSCHMIDT, OF BRESLAU, GERMANY.

SELF-FASTENING BOX.

SPECIFICATION forming part of Letters Patent No. 530,225, dated December 4, 1894.

Application filed May 31, 1893. Serial No. 476,073. (No model.)

*To all whom it may concern:*

Be it known that I, OSWALD HEINRICH, a subject of the Emperor of Germany, residing at Mittelwalde, in the Province of Silesia, Germany, have invented certain new and useful Self-Fastening Boxes, of which the following is a specification.

This invention relates to a box with movable sides, the latter being connected with each other by means of laps or straight-lined or undulated furrows catching into each other, the box being thus closed or opened. It would be well to make the lid as an ordinary removable side, viz: to arrange the said lap- or furrow-fastening between the lid and the sides of the box.

Figure 9:
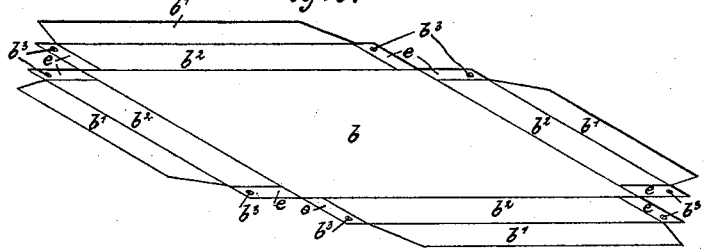
Figure 10:
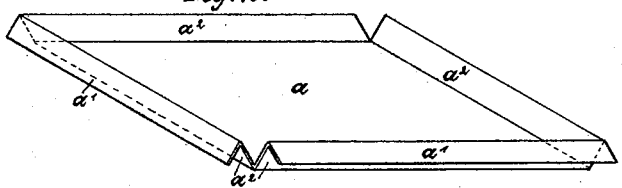
Figure 11:
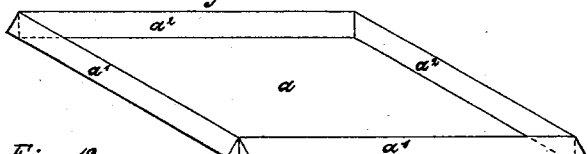
Figure 12:
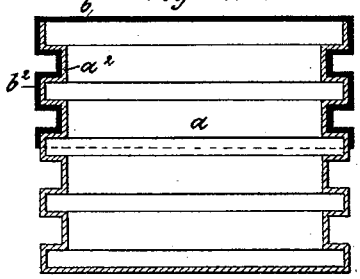
Figures 13, 14:
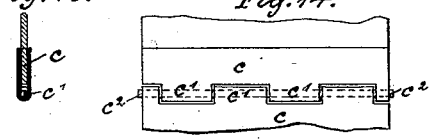
Figure 15:
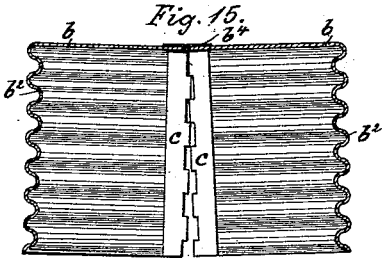
Figure 16:
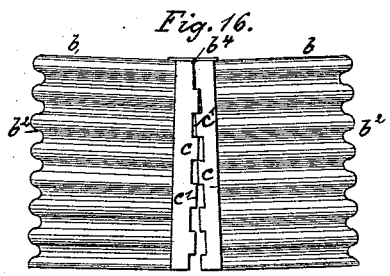

In the drawings—Figure 1, is a sectional view of one form of my improved box. Fig. 2, is a side view of the same. Figs. $1^a$, $2^a$ show sectional views, and Fig. $3^a$ a plan of a modification. Fig. 3, is a modified form of connection between the cover and the box body. Fig. 4, is a transverse section of Fig. 3. Figs. 5, 6, 7 and 8 are detail views of different ways of fastening the corners of the cover. Figs. 9, 10 and 11 are perspective views of the parts of the box detached. Fig. 12, shows a corrugated form of box and cover. Figs. 13 and 14 are views of details, and Figs. 15 and 16 are views of a modification.

In order to fasten the lid to the box by means of laps, the sides $a^2$ $b^2$ of the box $a$ and of the lid $b$ respectively, are provided with laps $a'$ $b'$, folding inside or outside. The sides, either of the lid only or of both parts of the box, which are otherwise firmly connected with each other, are also separated from each other as shown in perspective view by Fig. 9 for the lid and by Fig. 10 for the box.

Fig. 11 is a perspective view of a box of which the sides, which are provided with laps $b$, are firmly connected with each other as usual. The laps $a'$ $b'$ are in each case independent from each other. The sides $b^2$ of the lid, and also the sides $a^2$ of the box, if the latter are separated, are movable on the lid and to the bottom of the box relatively.

In order to connect the two parts of the box, their sides are folded into each other with their laps as shown by Fig. 1. After this the upper sides $b^2$ of the lid are connected with each other. Through this connection the sides of the box, which are covered over by the sides of the lid, are held together if the latter, as mentioned, are independent from each other and are only in connection with the bottom of the box. The separation of the sides of the box from each other may be sometimes of advantage for the packing of the articles for which the boxes are used. After the box has been closed with the lid, the joining of the sides $b^2$ of the lid may be effected in different ways. A very simple way to connect the meeting edges of the lid-sides $b^3$ is by means of a string $d$ which is drawn through the holes $b^3$ of the sides.

A safer way of connecting two walls is a pair of hinge-eye-plates which, as shown by Figs. 13 and 14, consists of two plates $c$ catching into each other by means of the hinge-eyes $c'$ and being held together by a hinge-pin $c^2$. Each hinge-plate is secured along the edge of a lid-side. See Fig. 12. As soon as the box is united with the lid by the sides and the laps being connected, each two adjoining plates $c$ are pushed into each other with their eyes $c'$ and joined together by means of their pin $c^2$ which so far was withdrawn from the eyes.

Fig. 2 shows on the one side the simple connection of the lid-sides by means of a string $d$ drawn through holes, in which case the side-edges may be strengthened by metal strips $e$. On the other side Fig. 2 shows the connection effected by the hinge-eye-plates before described.

If the laps $b'$ of the lid are arranged direct to a side serving as lid,—viz: if there are no lid-sides to go round the sides of the box,—the connection between the cover-plate $b$ and the box $a$ is formed as shown by Figs. $1^a$ to $3^a$.

One of the box-sides is parted in the middle and each half $a^2$ possesses a lap $a'$. The cover-plate $b$ is placed over the laps $a'$ situated on the outside, and each of its laps $b'$, which exist on two sides only, is pushed between one half-side $a^2$ and one side-lap $a'$. Connected in this manner, the cover-plate $b$ and the box are held fast by the before-described hinge-eye-plates $c\ c'$ and their pin $c^2$, these plates being fastened to the two lid-edges $b$ which have no laps, and to the two box-sides $a^3$ situated under the same.

Fig. 1$^a$ shows a transverse section of the box shown in Fig. 2$^a$ while Fig. 2$^a$ is a section of Fig. 1$^a$ on line $x—x$ thereof. From these it will be seen when taken in connection with Fig. 3$^a$ which is a plan view that the interlocking plates are only at the two opposing edges of the box, while the flaps extend along the other two edges.

The locking plates are more fully shown in detail in Figs. 13 and 14.

The second manner of fastening the lid to the box consists in the sides of the lid and of the box being furrowed and—the same as with the sides provided with laps—by being parted from each other, either at the lid only or both at the lid and at the box.

Figs. 3, 4, 7, 8, 12, and 16 are to represent the uniting of the box and the lid by means of side-furrows catching into each other. Figs. 3 and 4 show two boxes the side-furrows of which are undulated. Figs. 7 and 8 show the lid $b$ with furrowed sides parted in vertical direction, the same as with the lap-sides. The parting edges of the sides are provided with strengthening metal strips $e$ and holes $b^3$ or with hinge-eye-plates $c$ in order to be able to join them together. Fig. 12 represents a box of which the side-furrows are straight-lined.

In order to place the lid on the box and to be able to place the lid-furrows into the furrows of the box, first the parted lid-sides, movably joining the cover-plate of the lid, are folded open. Then the lid is placed on the box, and finally the lid-sides are refolded toward the box-sides. The lid-sides having been united with each other in the way explained, a safe connection is formed between the box and the lid.

In order to place the lid-sides over the sides of the box, the cover-plate of the lid may also have a joint $b^4$, so that the lid-sides, in consequence of the cover bending upward, may be drawn from each other without being movable at the cover-plate. See Figs. 15 and 16.

The ways above described for fastening a lid to its box are an advantageous substitute for the string used till now for the same purpose, because the fastening is effected by the respective parts of the box, a uniting of the sides of the box and of the lid being obtained all round, and the cutting of the string into the material (paste-board) of which the box consists and the consequent damaging of the contents of the box being done away with.

What I claim as my invention, and desire to secure by Letters Patent, is—

1. A box comprising the bottom and sides, the latter having portions constructed to interlock with parts of the cover, said cover having side interlocking portions adapted to be spread in placing or removing the cover and the means for holding the interlocking sides of the cover in engagement with the interlocking portions of the box body, substantially as described.

2. In combination the corrugated body, the cover having the corrugated sides, said sides being arranged to be spread and folded against the sides of the box and the means for holding the sides of the cover in their folded position, substantially as described.

Signed at Breslau, Province of Silesia, Empire of Germany, this 19th day of April, 1893.

OSWALD HEINRICH.

Witnesses:
MICHAEL GOLDSCHMIDT,
OSCAR BRAUER.